United States Patent
Andersson et al.

(10) Patent No.: US 12,296,720 B2
(45) Date of Patent: May 13, 2025

(54) METHOD, VEHICLE AND CONTROL UNIT FOR CONTROLLING BRAKE DISTRIBUTION OF SERVICE BRAKES

(71) Applicant: VOLVO TRUCK CORPORATION, Gothenburg (SE)

(72) Inventors: Arne Andersson, Mölnlycke (SE); Mats Fagergren, Kungälv (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 204 days.

(21) Appl. No.: 18/069,465

(22) Filed: Dec. 21, 2022

(65) Prior Publication Data

US 2023/0202305 A1    Jun. 29, 2023

(30) Foreign Application Priority Data

Dec. 21, 2021  (EP) ..................... 21216652

(51) Int. Cl.
    B60L 7/26    (2006.01)

(52) U.S. Cl.
    CPC ..................... B60L 7/26 (2013.01)

(58) Field of Classification Search
    CPC ........... B60L 7/26; B60T 8/323; B60T 8/1708
    USPC ......................... 701/70, 78, 81, 83
    See application file for complete search history.

(56) References Cited

U.S. PATENT DOCUMENTS

| | | | |
|---|---|---|---|
| 10,759,431 B2 * | 9/2020 | Fritz | B60W 10/08 |
| 11,938,909 B2 * | 3/2024 | Tagesson | B60W 10/06 |
| 2006/0069488 A1 * | 3/2006 | Sychra | B60L 7/26 |
| | | | 701/69 |

FOREIGN PATENT DOCUMENTS

| | | |
|---|---|---|
| DE | 102020108391 A1 | 9/2021 |
| WO | 2020052764 A1 | 3/2020 |

OTHER PUBLICATIONS

Extended European Search Report in corresponding European Application No. 21216652.4 dated Jun. 1, 2022 (8 pages).

* cited by examiner

*Primary Examiner* — Hai H Huynh
(74) *Attorney, Agent, or Firm* — Venable LLP; Jeffri A. Kaminski (57) ABSTRACT

A method performed by a control unit comprised in a vehicle for controlling a distribution of service brake activation between a first vehicle unit and a second vehicle unit of the vehicle is provided. The control unit determines a first periodic brake adjustment and a second periodic brake adjustment to be applied to an electric propulsion system and a service brake system of the vehicle. The control unit determines the first and second periodic brake adjustment, respectively, to adjust a retardation of the vehicle by less than a retardation threshold. The control unit applies the first periodic brake adjustment to the electric propulsion system of the vehicle and applies the second periodic brake adjustment to the service brake system of the vehicle. Applying the first periodic brake adjustment comprises periodically adjusting a charging power of the electric propulsion system of the vehicle. Applying the second periodic brake adjustment comprises periodically adjusting a brake pressure applied to the service brake system of the vehicle. Periodically adjusting the brake pressure applied to the service brake system triggers the service brake system to periodically activate one or more second service brakes of the second vehicle unit of the vehicle.

15 Claims, 7 Drawing Sheets

METHOD, VEHICLE AND CONTROL UNIT FOR CONTROLLING BRAKE DISTRIBUTION OF SERVICE BRAKES

TECHNICAL FIELD

The invention relates to a method, a vehicle, a vehicle unit, and a control unit for controlling brake distribution of service brakes.

The invention can be applied in electrified or partially electrified combination vehicles, typically heavy-duty vehicles, such as trucks comprising a tractor and a trailer. While tractors and trailers may be mentioned herein, the invention is applicable for controlling a distribution between service brakes of any vehicle units.

BACKGROUND

An electrified vehicle comprising a tractor and a trailer typically have two opportunities for controlling speed and/or retardation of the vehicle which can be used independently or in collaboration. These opportunities involve the use of a service brake system for braking the tractor and trailer, and an electric propulsion system which can brake the vehicle by converting energy of the vehicle to electrical energy, e.g. to charge a battery of the electric propulsion system.

However, it is not possible to brake the electrified vehicles in an unlimited manner. This is since when we have a high State of Charge (SoC) levels in a battery, the electric propulsion system can only accept a very low charging power which thus limits how much the electrified vehicle can brake using the electric propulsion system.

Furthermore, an electrified vehicle such as an Electrified truck (E-truck) does not have a combustion engine brake such as a Vehicle Engine Brake (VEB). Hence, when the SoC level is high for the E-truck, the E-truck will have a very low retardation capacity and may thus not be able to maintain a target speed or retardation of the E-truck. In other words, when the SoC level is high, the E-truck cannot brake for long before charging a battery full, and then the electric propulsion system cannot accept more charge and thus cannot brake the vehicle further.

Hence, the E-truck needs to also rely on service brakes as a complement to braking with the electric propulsion system. A problem with service brakes, for example when the E-Truck comprises a tractor and a trailer, is that their service brakes are not fully matched, i.e. they may activate for the trailer and tractor for different brake pressures. This may particularly be an issue when driving with cruise control where small retardation of the E-truck may be applied. This is since when trying to brake the E-truck, a brake pressure is increased until a required retardation is achieved. The tractor service brakes get activated at a lower pressure than the trailer service brakes, e.g. the tractor service brakes may be activated at 0.3 bar pressure and the trailer service brakes may be activated at 0.45 bar pressure. Since the tractor service brakes are activated at a lower pressure than the trailer service brakes, the trailer service brakes are used much less than the tractor service brakes. In extreme scenarios, the trailer brakes may never activate at all, as only activating the tractor service brakes may achieve the required retardation.

This causes an imbalance of brake usages, which means that the tractor brakes will be subject to more wear-down. Furthermore, brakes will heat up fast and will reach a maximum temperature limit long before the trailer brakes reach the maximum temperature limit. Hence the full capacity of the combined truck/trailer service brakes is not utilized. Hence, there is a need to improve brake usage for electrified combination vehicles.

SUMMARY

An object of the invention is to improve a usage distribution of service brakes in a vehicle.

According to the first aspect, there is provided a method performed by a control unit for controlling a distribution of service brake activation between a first vehicle unit and a second vehicle unit. The first vehicle unit may be a tractor and the second vehicle unit may be a trailer. The method comprises:

Determining a first periodic brake adjustment and a second periodic brake adjustment to be applied to an electric propulsion system and a service brake system of the vehicle, respectively, to adjust a retardation of the vehicle by less than a retardation threshold.

Applying the first periodic brake adjustment to the electric propulsion system of the vehicle and applying the second periodic brake adjustment to the service brake system of the vehicle.

Applying the first periodic brake adjustment comprises periodically adjusting a charging power of the electric propulsion system of the vehicle. Applying the second periodic brake adjustment comprises periodically adjusting a brake pressure applied to the service brake system of the vehicle. Periodically adjusting the brake pressure applied to the service brake system triggers the service brake system to periodically activate one or more second service brakes of the second vehicle unit of the vehicle.

Since the first and second periodic adjustments adjust the retardation of the vehicle by less than a retardation threshold, it is thus possible to periodically increase and decrease the use of the service brake system and the electric propulsion system without affecting the retardation. Hence, the vehicle will be able to retard or brake in the same manner, and, on average, use the same amount of brake power from the electric propulsion system and the service brake system while still being able to increase the brake pressure used by the service brake system periodically such that the service brake system triggers the service brake system to periodically activate one or more second service brakes of the second vehicle unit of the vehicle. In this way, the service brakes of the trailer will better be utilized without affecting retardation or other parameters of the vehicle. This is typically since the service brakes of the first and second vehicle unit activate at different brake pressures, and hence, increasing the brake pressure periodically will improve how often all service brakes of the service brake system are utilized.

Furthermore, this will avoid that service brakes of the first vehicle unit heat up too fast and reach a maximum temperature limit long before service brakes of the second vehicle unit, causing braking to be reduced to avoid excessive wear of the service brakes, even though the service brakes of the second vehicle unit are relatively cold and could have been used more. Instead the temperature build-up of the service brakes of the first and second vehicle unit is divided evenly which improves how long it is possible to use the service brakes.

Optionally, the method may further comprise:

Obtaining an indication of an available charging capacity of the electric propulsion system, wherein determining the first and second periodic brake adjustments is further based on the available charging capacity of the electric propulsion system.

Optionally, the method may further comprise applying the first periodic brake adjustment by charging the electric propulsion system with at most the available charging capacity.

Optionally, the method may further comprise obtaining the indication of the available charging capacity by:
obtaining a current SoC of the electric propulsion system, and
determining the available charging capacity for the electric propulsion system based on the obtained current SoC.

In some of these embodiments, the one or more second service brakes of the second vehicle unit are activated when the brake pressure applied to the service brake system is above a second brake pressure threshold.

Optionally, the method may further comprise obtaining a target speed and/or a target retardation of the vehicle, and using the target speed and/or the target retardation of the vehicle for determining the first and second periodic brake adjustments.

Optionally, determining the first and second periodic brake adjustments is further based on a timing parameter indicative of a frequency and/or period.

Optionally, determining the first and second periodic brake adjustments is further based on an amplitude parameter indicative of a maximum adjustment to be applied by the first and/or second periodic brake adjustments.

In some of these embodiments the first and second periodic brake adjustments are out of phase, e.g. are in anti-phase.

According to a second aspect, a control unit configured to perform the method according to the first aspect is provided.

According to a third aspect, a first vehicle unit comprising a control unit according to the second aspect is provided. The first vehicle unit is arranged to be connected with a second vehicle unit. The first vehicle unit may typically be a tractor, but may also be a trailer.

Optionally, the first vehicle unit comprises an electric propulsion system.

According to a fourth aspect, a vehicle comprising a first vehicle unit according to the third aspect is provided. The vehicle further comprises:
a second vehicle unit,
a service brake system arranged to brake the vehicle based on a brake pressure, and wherein the service brake system is arranged to trigger an activation of one or more first service brakes of unit first vehicle unit and one or more second service brakes of the second vehicle unit based on respective brake pressure thresholds, and
an electric propulsion system arranged to brake the vehicle by converting energy of the vehicle to charge the electric propulsion system with a charging power.

According to a fifth aspect, a computer program comprising program code means for performing the method of the first aspect when said program is run on a computer is provided.

According to a sixth aspect, a computer readable medium carrying a computer program comprising program code means for performing the method of the first aspect when said program product is run on a computer is provided.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

It is to be understood that the present invention is not limited to the embodiments described above and illustrated in the drawings; rather, the skilled person will recognize that many changes and modifications may be made within the scope of the appended claims.

Figure 1:
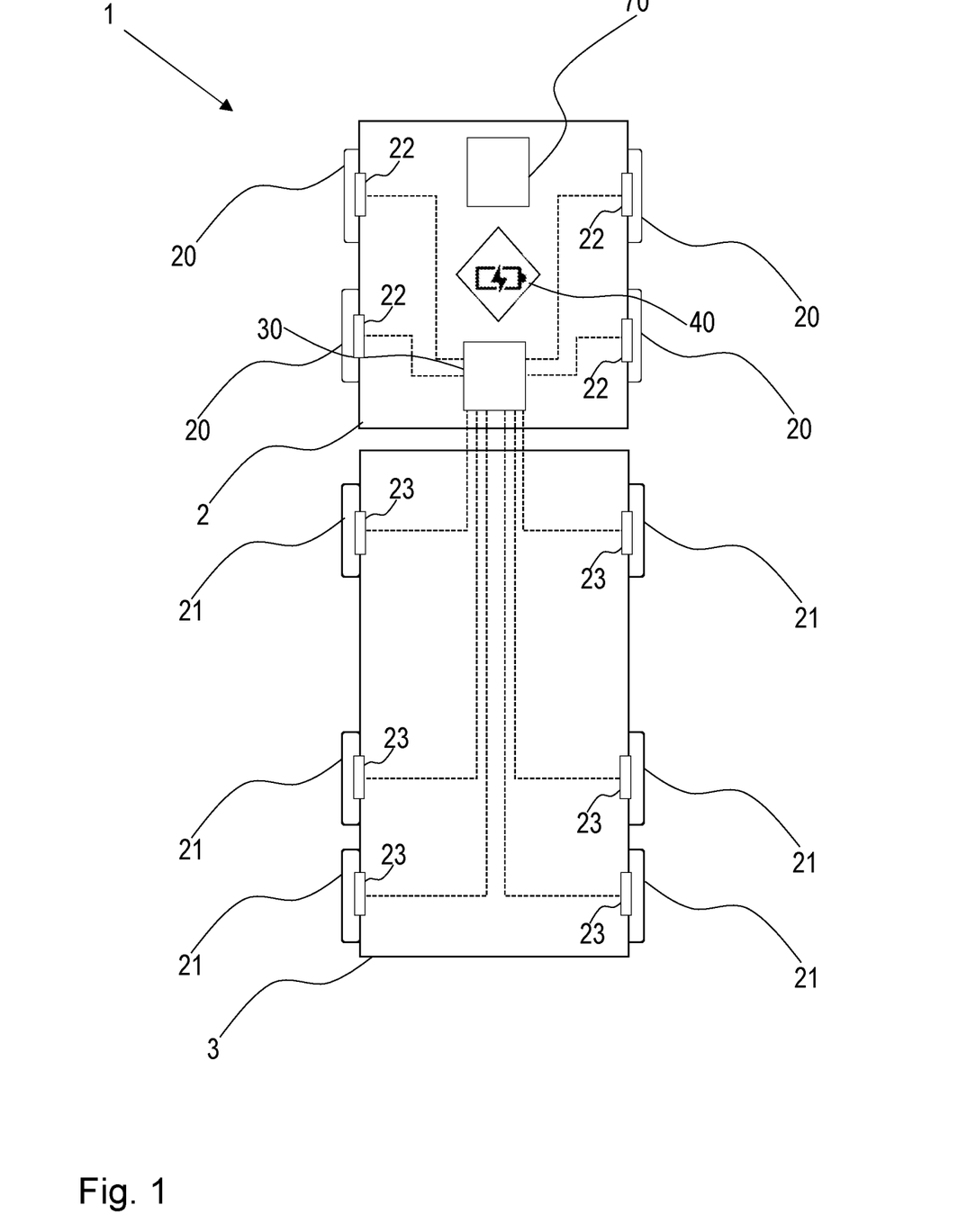
FIG. 1 is a schematic block diagram illustrating embodiments herein.

FIG. 1 is a schematic overview of a vehicle 1 in accordance with embodiments herein. FIG. 1 illustrates the vehicle 1, which in the illustrated embodiment comprises a first vehicle unit 2 and a second vehicle unit 3.

The first vehicle unit 2 is in FIG. 1 illustrated as a tractor and the second vehicle unit 3 is illustrated as a trailer, but any other suitable combination, may also be applicable to embodiments herein. The vehicle 1 is an electrified or partially electrified vehicle comprising an electrical propulsion system 40, arranged in any one of the first vehicle unit 2 and the second vehicle unit 3.

The vehicle 1 is arranged to, at least partially, be driven by the use of the electrical propulsion system 40. To control a speed and/or retardation of the vehicle 1, the electrical propulsion system 40 may convert energy of the vehicle 1 into electrical energy to charge the electric propulsion system 40 with a charging power to be stored in an energy storage system (not shown) and/or to be used by the electric propulsion system 40.

The energy storage system may be any suitable energy storage device such as a battery, e.g. a Battery Electric Vehicle (BEV) battery or a Fuel Cell (FC) battery of the electrical propulsion system 40. The energy storage system may additionally or alternatively comprise a supercapacitor for storing energy. To convert energy of the vehicle to charging power, the electric propulsion system may comprise and use a retarder. Furthermore, as an alternate and/or additional way to control the speed and/or retardation of the vehicle 1, the vehicle 1 comprises a service brake system 30.

The service brake system 30 is arranged to brake the vehicle 1 based on a brake pressure applied to the service brake system 30. The brake pressure may be applied in any suitable manner, but is typically applied from, or triggered by, some automated module in the vehicle 1, which automated module at least controls speed and/or retardation of the vehicle 1, e.g., a cruise control module. The service brake system 30 may be arranged to trigger an activation of one or more first service brakes 22 of the first vehicle unit 2 and one or more second service brakes 23 of the second vehicle unit 3 based on respective brake pressure thresholds.

For example, the first service brakes 22 are activated to brake first wheels 20 of the first vehicle unit 2 when the applied brake pressure is above a first brake pressure threshold, e.g. 0.3 bar, and the second service brakes 24 are activated to brake the second wheels 21 of the second vehicle unit 3 when the applied brake pressure is above a second brake pressure threshold, e.g. 0.45 bar.

Embodiments herein may be performed by a control unit 70. The control unit 70 is typically comprised in the first vehicle unit 2, but may be arranged in any suitable location, e.g. also in the second vehicle unit 3. The control unit 70, and/or the vehicle unit in which it is arranged, e.g. the first or second vehicle unit 2, 3, may be in communication with the electric propulsion system 40 and the service brake system 30 such that the control unit 70 may be able to perform the embodiments herein without having direct control over all of the service brakes in the service brake system 30 and/or the electric propulsion system 40.

In an example scenario, the first vehicle unit 2 may be a tractor comprising the control unit 70. The first vehicle unit 2 may be pulling the second vehicle unit 3 which may be a trailer. The control unit 70 may have a connection with the electric propulsion system 40 which is comprised in the first vehicle unit 2. The control unit 70 may also have a connection with the service brake system 30 such that the control unit 70 and/or the service brake system 30 is capable of applying a brake pressure to first service brakes 22 and the second service brakes 23 in accordance with embodiments herein. The second vehicle unit 3 may be any suitable trailer which may not need any modification to be applicable for embodiments herein. The second vehicle unit 3 may only need to be arranged in connection with the service brake system 30 and/or the control unit 70, such that the service brake system 30 and/or the control unit 70 may apply a brake pressure to the second service brakes 23.

Figure 2:
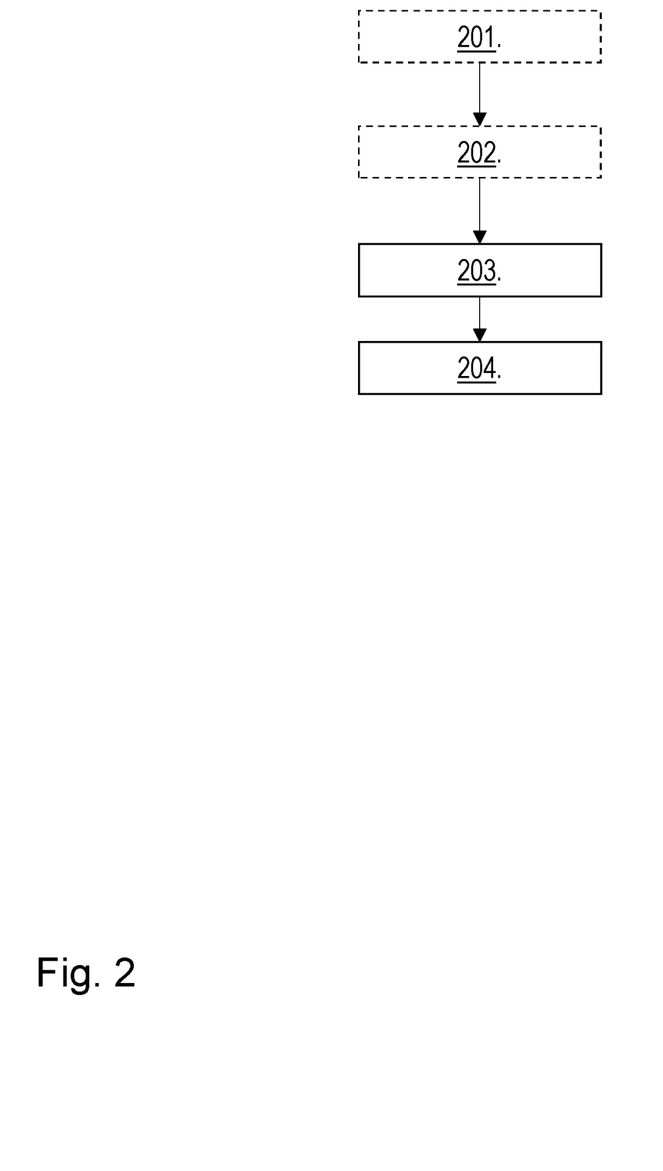
FIG. 2 is a flowchart illustrating a method according to embodiments herein.

FIG. 2 shows example embodiments of a method performed by the control unit 70 comprised in the vehicle 1 for controlling a distribution of service brake activation between the first vehicle unit 1 and the second vehicle unit 3 of the vehicle 1.

In some embodiments, the method is performed iteratively or continuously, e.g. such that any suitable action below is triggered to be performed every charging time period. The method comprises the actions described below, which actions may be taken in any suitable order unless mentioned otherwise. Optional actions are referred to as dashed boxes in FIG. 2.

Action 201. In some embodiments, the method comprises obtaining an indication of an available charging capacity of the electric propulsion system 40. The charging capacity may be any suitable charging capacity indicating how much it is possible to charge, or how much it is possible to additionally charge the electric propulsion system 40. For example, the charging capacity may be a charging capacity of an energy storage system of the electric propulsion system 40, such as an available charging power of any suitable battery. In some embodiments, the charging capacity may comprise an indicator of how much it is possible to increase a current charging power of the electrical propulsion system, at least momentarily, e.g., by at most a predetermined charging power threshold from the current charging power. The charging capacity may be the charging capacity for a charging time period. The charging time period may vary from contexts, vehicles and energy storages systems, but may be a relatively short time period, e.g. between 3 and 15 seconds, or up to 30 seconds. The charging capacity may be obtained every charging time period, or using any suitable interval or frequency. The charging capacity may for example comprise indications of any one or more out of a maximum permitted charging power and an allowable continuous permitted charging power. It may not be possible to increase the charging power above the maximum permitted charging power. The allowable continuous permitted charging power may relate to a charging power allowed to be continuously applied for the charging time period. The charging capacity may also indicate a current charging power.

In some embodiments, obtaining the indication of the available charging capacity comprises obtaining a current SoC of the electric propulsion system 40, e.g. such as a current SoC level of the energy storage system of the electrical propulsion system, and determining the available charging capacity for the electric propulsion system 40 based on the obtained current SoC. For example, using the determined SoC level it may be possible to determine the maximum permitted charging power and/or the allowable continuous permitted charging power. Determining the available charging capacity using the SoC may be performed by any suitable means, e.g. by using predetermined models of the energy storage system in relation to SoC levels, mapping SoC levels to any suitable power capacity, e.g. the maximum permitted charging power and/or the continuous permitted charging power. Determining the available charging capacity may also be based on a temperature, e.g. of the electric propulsion system and/or its energy storage system.

Action 202. In some embodiments, the method comprises obtaining a target speed and/or a target retardation of the vehicle 1. The target speed and/or the target retardation may be obtained by any suitable means, for example by a cruise control module or any suitable control unit controlling the target speed and/or retardation of the vehicle 1.

Action 203. The method comprises determining a first periodic brake adjustment and a second periodic brake adjustment to be applied to an electric propulsion system 40 and a service brake system 30 of the vehicle 1, respectively, to adjust a retardation of the vehicle 1 by less than a retardation threshold. The retardation threshold may be predetermined to a fixed amount or may be a fixed percentage of current speed and/or retardation of the vehicle 1.

Determining first periodic brake adjustment and the second periodic brake adjustment may comprise determining or evaluating how applying the first periodic brake adjustment and the second periodic brake adjustment may affect any one or more out of: a current brake pressure applied to the service brake system 30, a current charging power by the electrical propulsion system 40, a current speed and/or retardation.

In some embodiments, determining the first and second periodic brake adjustments is further based on a timing parameter indicative of a frequency and/or period. For example, the first and second periodic brake adjustments may need to have a certain frequency or period, e.g. 5 seconds, since it may not be possible to change brake pressure and/or charging power too quickly. The first and second periodic brake adjustment periods may be shorter than the charging time period, and/or a function of the charging time period such that the first and second periodic brake adjustments have time to iterate several times during the charging time period.

Furthermore, any of the first and/or second service brakes 22, 23 may be associated with an activation time it takes for the service brakes to activate. The activation time may e.g. be due to that the brakes 22, 23 may consume air pressure when they activate or are adjusted. For longer adjustment periods, the effect of the activation time may be too large to keep the retardation below the retardation threshold, and hence, the first and second periodic brake adjustment periods may need to be limited.

In some embodiments, determining the first and second periodic brake adjustments is further based on an amplitude parameter indicative of a maximum adjustment to be applied by the first and/or second periodic brake adjustments. The maximum adjustment may be a constant or percentage of how much we allow a change in brake pressure and/or charging power. The amplitude parameter may be associated with the maximum permitted charging power, e.g. a difference between the maximum permitted charging power and the current charging power of the electrical propulsion system 40. The amplitude parameter may be based on a current applied brake pressure. For example, when the current brake pressure to the service brake system is 0.3 bar, and the second brake pressure threshold is at 0.45 bar, the second periodic brake adjustment need to be determined such that it ensures that the applied brake pressure to the service brake system 30 will be higher than 0.45 bar, e.g. by more than a predetermined amplitude threshold, to ensure that the second service brakes 23 are activated e.g. for at least some predetermined activation time period.

In some embodiments, determining the first and second periodic brake adjustments is further based on the available charging capacity of the electric propulsion system 40, e.g. as obtained in above action 201. For example, the first periodic brake adjustment may be determined such that on peak charging power, the charging power is the maximum permitted charging power but the first periodic brake adjustment will still, on average, adhere to the continuous permitted charging power. The second periodic brake adjustment will be determined to match the first periodic brake adjustment such that the retardation is below the retardation threshold.

In some embodiments, determining the first and second periodic brake adjustments is performed by using the target speed and/or the target retardation of the vehicle 1, e.g. as obtained in action 201.

Determining the first and second periodic brake adjustments may comprise determining suitable period functions for the first and second periodic brake adjustments based on any one or more out of the above-mentioned parameter. The periodic functions of the first and/or second periodic brake adjustments may typically be determined e.g. modelled, by use of any trigonometric function such as sine or cosine, or by the use of any other suitable periodic function, e.g. any function out of ramp-functions, triangle wave functions, sawtooth functions, or square wave functions. The periodic functions may be determined, e.g. modelled, using any one or more out of the above-mentioned parameters for periodicity, phase, frequency, etc.

The first and second periodic brake adjustment may be determined such that periodically adjusting the brake pressure applied to the service brake system 30, e.g. by the second periodic brake adjustment, triggers the service brake system 30 to periodically activate the one or more second service brakes 23 of the second vehicle unit 3 of the vehicle 1. For example, in this way, the second periodic brake adjustment needs to be determined such that when applied to the current brake pressure, the current brake pressure in combination with the second periodic brake adjustment is at least partially above the second brake pressure threshold, i.e. such that the second service brakes 23 are activated.

The first and second periodic brake adjustments may be determined such that they maintain, e.g. at least approximately, a current retardation and/or speed, but still increases how much and/or how often the brake pressure for the service brake system 30 is increased, e.g. such that the second service brakes 23 are activated.

Action 204. The method comprises applying the first periodic brake adjustment to the electric propulsion system 40 of the vehicle 1 and applying the second periodic brake adjustment to the service brake system 30 of the vehicle 1. Applying the first periodic brake adjustment comprises periodically adjusting a charging power of the electric propulsion system 40 of the vehicle 1. Applying the second periodic brake adjustment comprises periodically adjusting a brake pressure applied to the service brake system 30 of the vehicle 1.

Applying the first periodic brake adjustment may further relate to adjusting a current charging power of the electric propulsion system 40, e.g. to periodically maximize the charging power of the electric propulsion system 40 to the maximum permitted charging power. While the current charging power may be periodically increased by applying the first periodic brake adjustment, the average charging power, e.g. over the charging time period, may be the same as what the charging power would have been if considering a normal change in charging power and SoC, or may differ from a normal change in charging power by a small margin e.g. 1-5%.

In some embodiments, applying the first periodic brake adjustment comprises charging the electric propulsion system 40 with at most the available charging capacity. For example, the available charging capacity may be the maximum permitted charging power and/or a maximum power for a certain time, e.g. the charging time period. This may be the maximum energy which can be stored in the electric propulsion system 40 during the charging time period.

In some embodiments, the one or more second service brakes 23 of the second vehicle unit 3 are activated when the brake pressure applied to the service brake system 30 is above a second brake pressure threshold. A typical second brake pressure threshold, e.g. when the second vehicle unit 3 is a trailer may be between 0.4 bar and 0.6 bar, e.g. 0.45 bar. In a corresponding manner, in some embodiments, the one or more first service brakes 22 of the first vehicle unit 2 are activated when the brake pressure applied to the service brake system 30 is above a first brake pressure threshold. A typical first brake pressure threshold, e.g. when the first vehicle unit 3 is a tractor may be between 0.2 bar and 0.4 bar, e.g. 0.3 bar. In other words, the first vehicle unit 2 and the second vehicle unit 3 may have service brakes 22, 23 which activates for different brake pressures. Hence, when the second periodic brake adjustments is applied, as the brake pressure to the service brake system 30 is periodically increased, the second periodic brake adjustment ensures that the seconds service brakes 23 of the second vehicle unit 3 will be better utilized. This further reduces strain and/or temperature of the first service brakes 22 of the first vehicle unit 2 as they will be supported by the second service brakes 23.

In some embodiments, the first and second periodic brake adjustments are out of phase, e.g. are in anti-phase. In this way, it is ensured that the change in retardation when applying the first and second periodic brake adjustments is very small, e.g. smaller than a predetermined retardation variation threshold. In particular, the variation of the retardation when applying the first and second periodic brake adjustments is tolerably low when the phase difference of the first and second periodic brake adjustments is close to being in anti-phase, e.g. when the first and second periodic brake adjustments are sine-based amplitude variations and the phase difference differs from pi/2 by a predetermined phase-shift threshold.

Above actions and embodiments will now be exemplified by embodiments below. Any embodiment or action above or below may when suitable be combined in any suitable manner.

Figure 3:
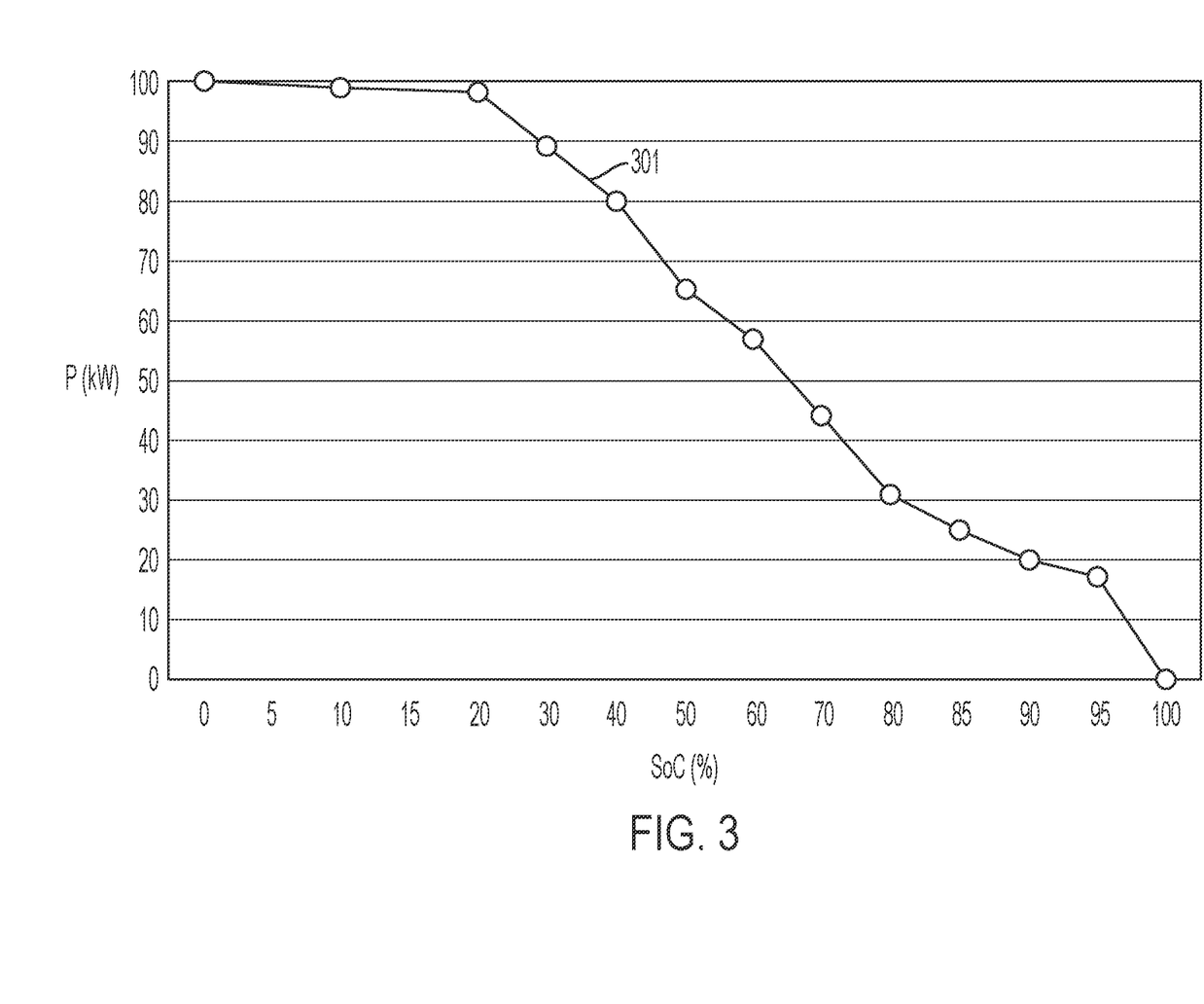
FIG. 3 is a line chart illustrating a scenario according to embodiments herein.

FIG. 3. illustrates an example scenario wherein the electrical propulsion system 40 comprises an example BEV battery, however the scenario is applicable for any suitable energy storage system. In this scenario, applying the first periodic brake adjustment e.g. as in Action 204, adjusts a charging power of the BEV battery. For the BEV battery, an example power curve 301 is illustrated. The X-axis illustrates an example SoC level in percentage (%) of highest possible SoC for the example BEV battery and the Y-axis illustrates a percentage of a maximum allowed charging power P of the example BEV battery, e.g. 100 kilowatt (kW), which can be applied for the example BEV battery at respective SoC levels. The power curve 301 need to be adhered to by the electric propulsion system 40 since the example BEV battery cannot accept a higher charging power at respective SoC levels. However, it is allowed, e.g., as in the above actions 201-204, to adjust periodically the charging power of the electric propulsion system 40, as long as the power curve 301 is adhered to at an average. In other words, it is possible to cycle the power around the power curve 301.

Figure 4:
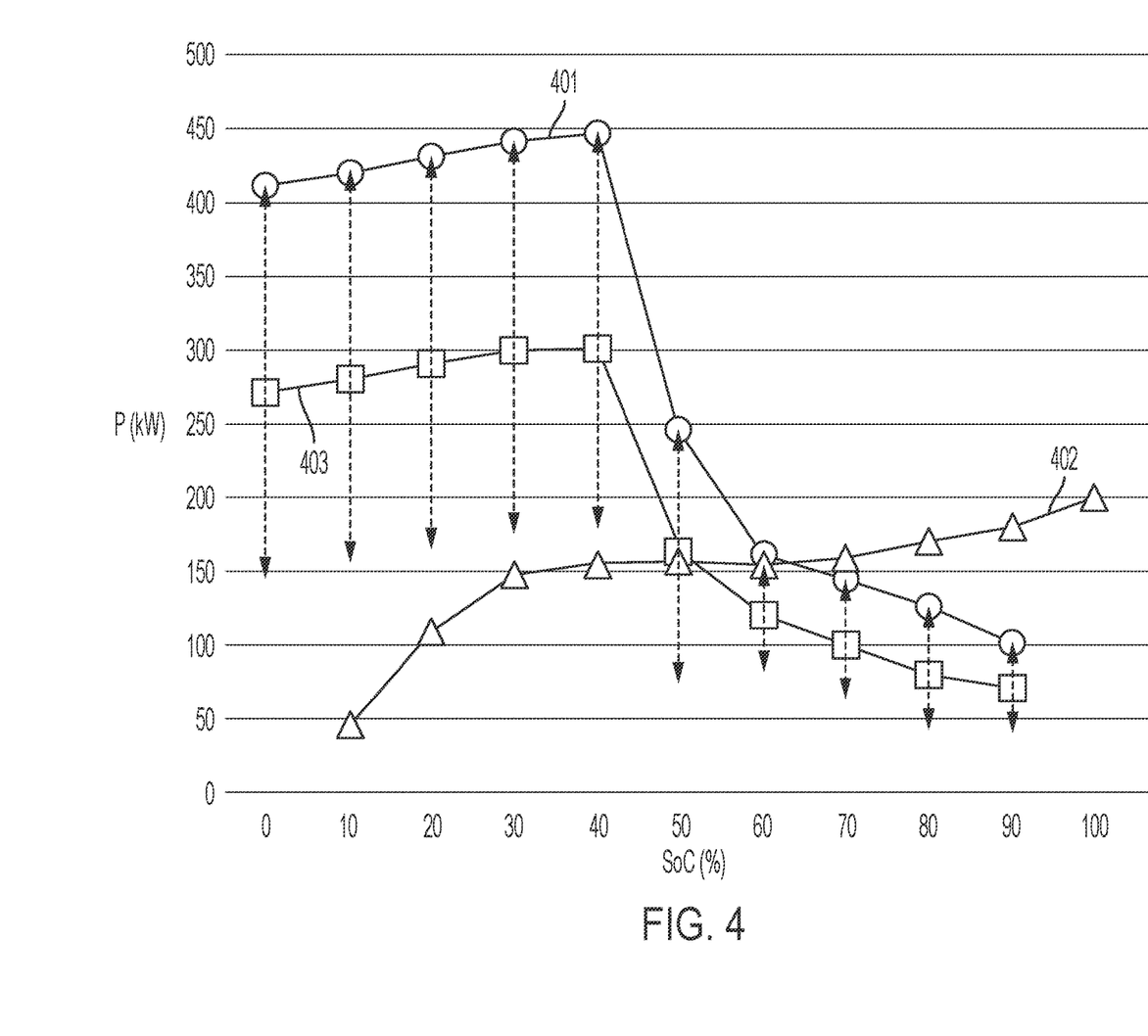
FIG. 4 is a line chart illustrating a scenario according to embodiments herein.

FIG. 4. illustrates a corresponding graph to FIG. 3. for an FC battery e.g. comprised in the electrical propulsion system 40, however the scenario is applicable for any suitable energy storage system. In this scenario, applying the first periodic brake adjustment adjusts a current charging power of the FC battery. In FIG. 4, the X-axis represent an SoC level of the FC battery in percentage. The Y-Axis show charging and discharging power P in kW for the corresponding SoC levels. In FIG. 4, curve 401 illustrates a maximum allowable charging power of the FC battery for a time period, e.g. 30 seconds or the charging time period, for the corresponding SoC levels. In FIG. 4, curve 402 illustrates a discharge of the FC battery, e.g. for use by the electric propulsion system 40 to drive the vehicle 1. The discharge may be used for determining future power usage. In FIG. 4, curve 403 illustrates a permitted continuous charging for the corresponding SoC levels. In FIG. 4, the arrowed lines around curve 403 illustrates that it is possible to swing the charging power from the permitted continuous charging power up to the maximum allowable charging power as in curve 401, and equally below the curve 403 to adhere to the permitted continuous charging power on average. This may for example be performed by the first periodic brake adjustment as discussed in Actions 201-204 above.

As an example, in the scenario of FIG. 4, it may be possible to, at some SoC levels, swing the charging power of the electrical propulsion system 40 between 450 kW and 150 kW, which means a periodic adjustment with a double amplitude of 300 kW e.g. as in the first periodic brake adjustment, e.g. at an interval of the charging time period or 30 seconds. To not affect the retardation of the vehicle 1 dramatically, this may also require swinging the service brake power correspondingly but in counter phase, e.g. as in the second periodic brake adjustment as discussed in Action 201-204. In this way, it is possible to cycle the service brakes of the service brake system 30 and charging of the battery in the electrical propulsion system 40 simultaneously but in an anti-phase such that the vehicle retardation of the vehicle 1 is constant or with low periodic variation. The service brake cycling of the service brake system 30 will improve brake distribution between tractor and trailer. Cycling the service brake system 30 may comprise periodically increasing the brake pressure applied to the service brake system 30, which increases the usage of both of the first and second service brakes 22, 23. This is since when the brake pressure is increased, at least for half of the periods of the first and second periodic brake adjustments, the brake pressure will be above both of the first and second brake pressure thresholds concurrently more often than if the brake pressure would remain unchanged.

Figure 5A:
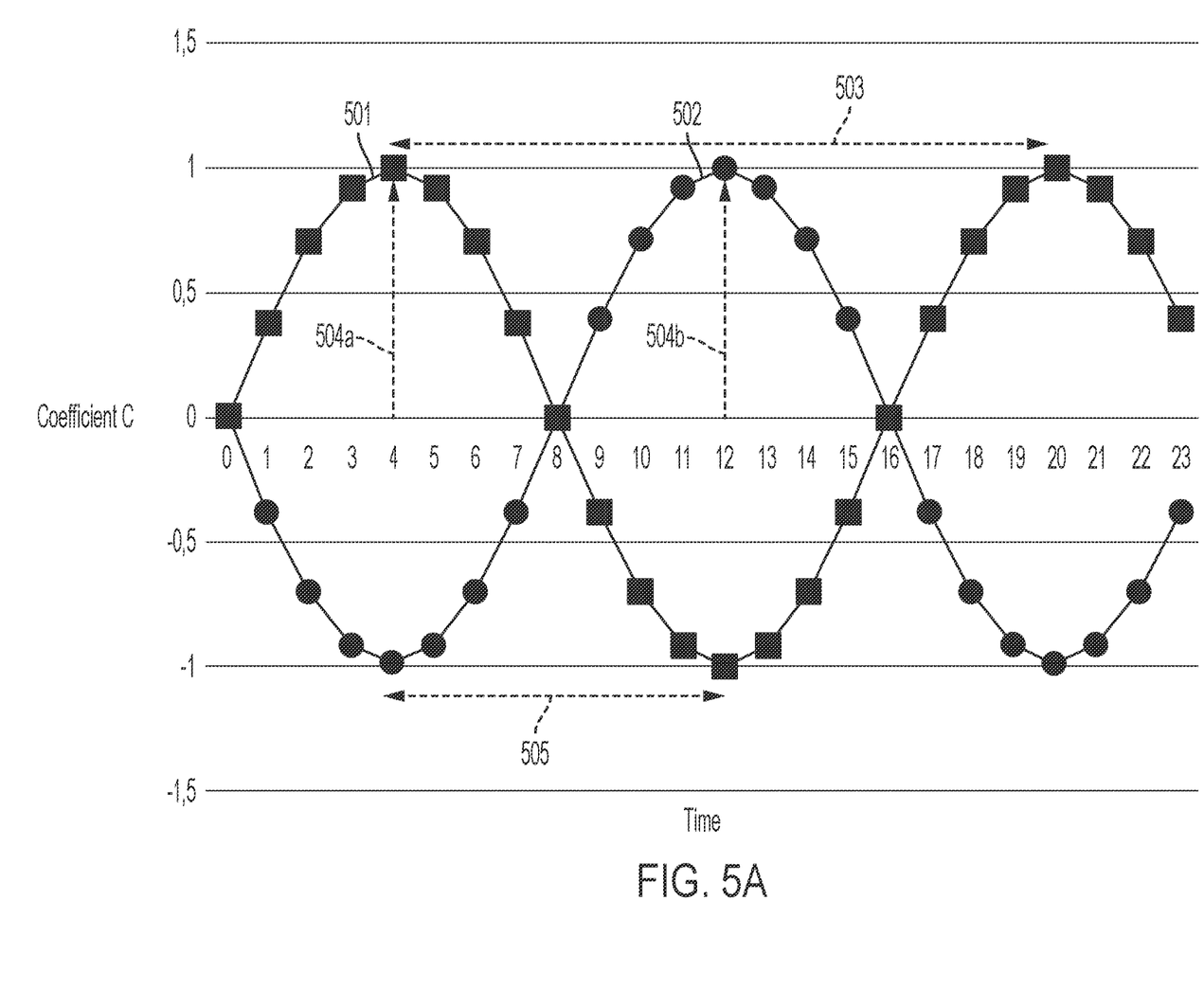
FIGS. 5a-b are line charts illustrating a scenario according to embodiments herein.
Figure 5B:
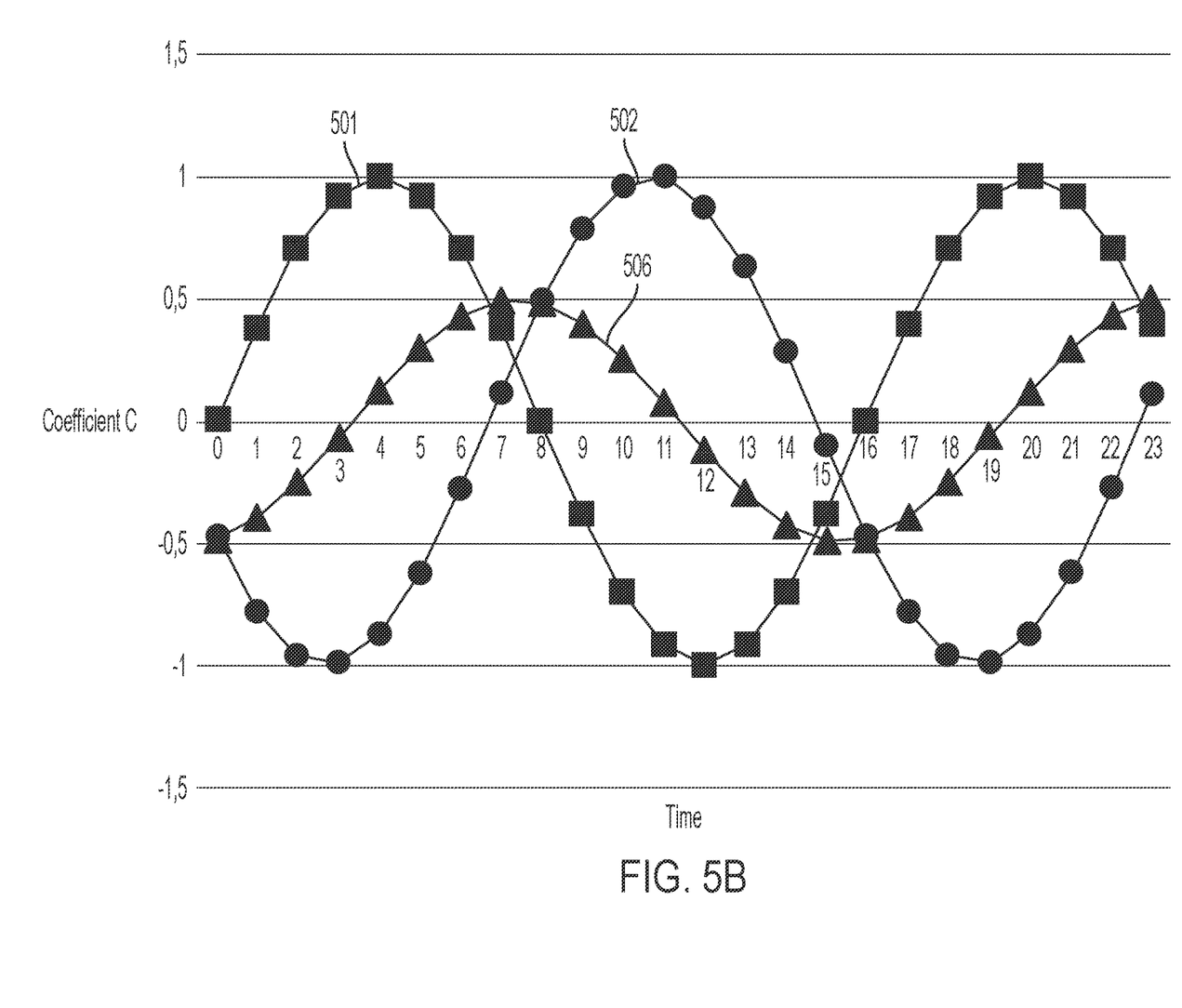

FIGS. 5a-b are example scenarios illustrating the first periodic brake adjustment by a first adjustment 501, and the second periodic brake adjustment by a second adjustment 502. In both FIGS. 5a and 5b, the X-axis is time in seconds, and the Y-axis indicates an adjustment of brake power or retardation achieved when applying the first and second adjustment 501, 502, e.g. as in Action 204. The first and second adjustments 501, 502 may on the Y-axis indicate a coefficient C which multiplied with respective maximum adjustments for the first and second adjustments 501, 502 result in respective change in brake power, retardation, brake pressure and/or charging power to be applied in the electric propulsion system 40 and/or the service brake system 30. While the example scenarios of FIGS. 5a-b use coefficient C between 1 and −1, the first and second periodic brake adjustments may be determined or modelled using any suitable approach.

In other words, in the examples of FIGS. 5a-b, the curves are cycled around 0. However, the first and second periodic brake adjustments may use similar functions as in the first and second adjustments 501, 502 to be cycled around any suitable kW.

In FIG. 5a, a period of the first adjustment 501 is illustrated by period 503. Amplitudes of the first and second adjustments 501, 502, are illustrated by amplitudes 504a, 504b. A phase-shift of the first and second adjustments 501, 502 is illustrated by a phase-shift 505, e.g. showing that the first and second adjustments 501, 502 are in anti-phase.

FIG. 5a may be an example how brake pressure and charging power may periodically be adjusted, e.g. as in Actions 201-204. For example, when the first adjustment 501 is at C=1, e.g. around 4 seconds, the applied brake pressure in the service brake system 30 may be increased with a maximum brake pressure adjustment, and when the first adjustment 501 is at C=−1, e.g. around 12 seconds, the applied brake pressure may be reduced by the maximum brake pressure adjustment. Correspondingly, when second adjustment 502 is at C=−1, e.g. around 4 seconds, the charging power in the electric propulsion system 40 may be reduced with a maximum charging power adjustment, and when the second adjustment 502 is at C=1, e.g. around 12 seconds, the charging power in the electric propulsion system 40 may be increased with the maximum charging power adjustment.

In FIG. 5b, the first and second adjustments 501, 502, are similar as in FIG. 5a, but in this scenario they are not in perfect anti-phase, and thus a small periodic retardation is achieved when applying the first and second adjustments 501, 502, which is illustrated by an adjustment sum 506. In some embodiments, the first and second adjustments 501, 502 are only applied, e.g. as in Action 204, when the adjustment sum 506 is determined, e.g. in Action 203, to always be below an adjustment sum threshold.

To perform the method actions described herein, the control unit 70 may be configured to perform any one or more of the above actions 201-204 or any of the other examples or embodiments herein. The control unit 70 may for example comprise an arrangement depicted in FIGS. 6a and 6b.

Figure 6A:
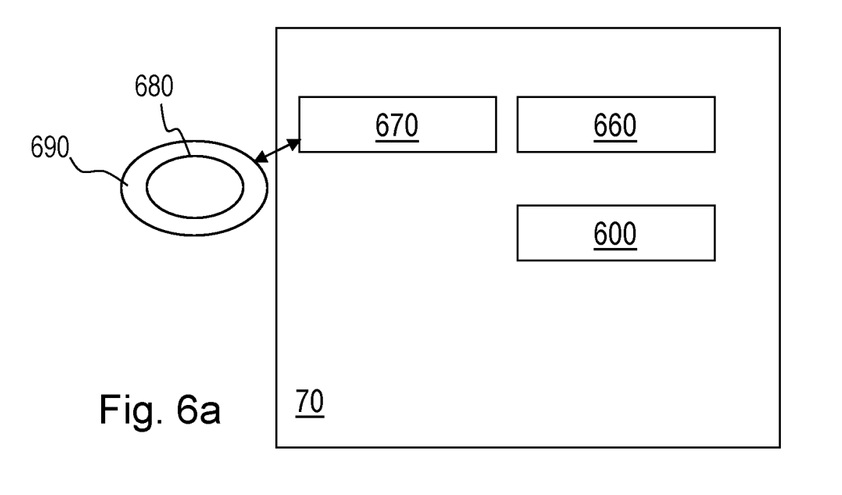
FIGS. 6a-b are schematic block diagrams illustrating a control unit according to embodiments herein.
Figure 6B:
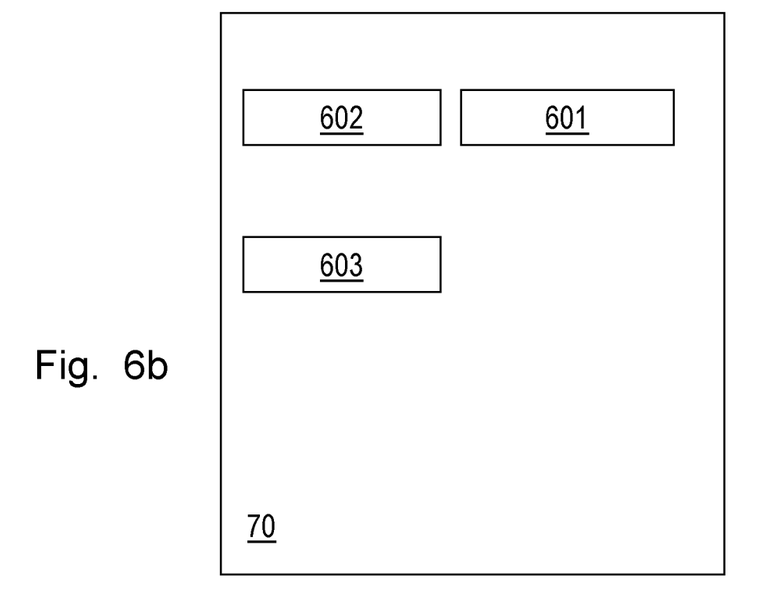

The control unit 70 may comprise an input and output interface 600 configured to communicate with the entities of embodiments herein, such as e.g. any one or more out of the electric propulsion system 40, the service brake system 30, and any suitable device in the first vehicle unit 2 and/or the second vehicle unit 3. The control unit 70 is capable of performing the embodiments herein without needing to be arranged in proximity of any the named entities, as any suitable communication means for controlling them is sufficient.

For example, the control unit 70 may be arranged in the first vehicle unit 2, e.g. a tractor, and may control the adjustments to the second service brakes 23 of the second vehicle unit 3, e.g. a trailer, by communication with any suitable entity controlling the service brakes 23 of the second vehicle unit 3. Since the control unit 70 only needs to be able to communicate with a suitable entity, such as a separate control unit of the second vehicle unit 3, to control the second service brakes 23 of the second vehicle unit 3, the second vehicle unit 3 may not need to be modified for embodiments herein.

The input and output interface 600 may comprise a wireless and/or wired receiver (not shown) and a wireless and/or wired transmitter (not shown), e.g. for communication with and/or control of any of the above named entities.

The control unit 70 may be configured to, e.g. by means of an obtaining unit 601 in the control unit 70, obtain an indication of an available charging capacity of the electric propulsion system 40.

The control unit 70 may be configured to, e.g. by means of the obtaining unit 601 in the control unit 70, obtain the indication of the available charging capacity by
  obtaining, e.g. by means of the obtaining unit 601 in the control unit 70, a current SoC of the electric propulsion system 40, and
  determining, e.g. by means of a determining unit 602 in the control unit 70, the available charging capacity for the electric propulsion system 40 based on the obtained current SoC.

The control unit 70 may be configured to, e.g. by means of the determining unit 602 in the control unit 70, determine a first periodic brake adjustment and a second periodic brake adjustment to be applied to an electric propulsion system 40 and a service brake system 30 of the vehicle 1, respectively, to adjust a retardation of the vehicle 1 by less than a retardation threshold.

The control unit 70 may be configured to, e.g. by means of the obtaining unit 601 in the control unit 70, obtain a target speed and/or a target retardation of the vehicle 1, and use the target speed and/or the target retardation of the vehicle 1 for determining e.g. by means of the determining unit 602, a first and second periodic brake adjustment.

The control unit 70 may be configured to, e.g. by means of an applying unit 603 in the control unit 70, apply the first periodic brake adjustment to the electric propulsion system 40 of the vehicle 1 and applying the second periodic brake adjustment to the service brake system 30 of the vehicle 1.

The control unit 70 may be configured to, e.g. by means of the applying unit 603 in the control unit 70, apply the first periodic brake adjustment by charging the electric propulsion system 40 with at most the available charging capacity.

The control unit 70 may be configured to, e.g. by means of the applying unit 603 in the control unit 70, apply the first periodic brake adjustment by periodically adjusting a charging power of the electric propulsion system 40 of the vehicle 1, and apply the second periodic brake adjustment by periodically adjusting a brake pressure applied to the service brake system 30 of the vehicle 1. Periodically adjusting the brake pressure applied to the service brake system 30 may trigger the service brake system 30 to periodically activate one or more second service brakes of the second vehicle unit 3 of the vehicle 1.

The embodiments herein may be implemented through a respective processor or one or more processors, such as the processor 660 of a processing circuitry in the control unit 70 depicted in FIG. 6a, together with respective computer program code for performing the functions and actions of the embodiments herein. The program code mentioned above may also be provided as a computer program medium, for instance in the form of a data computer readable medium carrying computer program code for performing the embodiments herein when being loaded into the control unit 70. One such computer readable medium may be in the form of a memory stick. The computer program code may furthermore be provided as pure program code on a server and downloaded to the control unit 70.

The control unit 70 may further comprise a memory 660 comprising one or more memory units. The memory 660 comprises instructions executable by the processor in control unit 70. The memory 660 is arranged to be used to store e.g. information, indications, data, configurations, functions, models, SoC levels and associated permitted charging powers for certain energy storage systems, and applications to perform the methods herein when being executed in the control unit 70.

In some embodiments, a computer program 680 comprises instructions, which when executed by the respective at least one processor 660, cause the at least one processor of the control unit 70 to perform the actions 201-204 above.

In some embodiments, a respective computer readable medium 690 comprises the respective computer program 680, wherein the computer readable medium 690 is one of an electronic signal, an optical signal, an electromagnetic signal, a magnetic signal, an electric signal, a radio signal, a microwave signal, or a computer-readable storage medium.

Those skilled in the art will appreciate that the units in the control unit 70 described above may refer to a combination of analog and digital circuits, and/or one or more processors configured with software and/or firmware, e.g. stored in the control unit 70, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

The invention claimed is:

1. A method performed by a control unit comprised in a vehicle for controlling a distribution of service brake activation between a first vehicle unit and a second vehicle unit of the vehicle, the method comprising:
  determining a first periodic brake adjustment and a second periodic brake adjustment to be applied to an electric propulsion system and a service brake system of the vehicle, respectively, to adjust a retardation of the vehicle by less than a retardation threshold,
    wherein applying the first periodic brake adjustment comprises periodically adjusting a charging power of the electric propulsion system of the vehicle, and wherein applying the second periodic brake adjustment comprises periodically adjusting a brake pressure applied to the service brake system of the vehicle, and wherein periodically adjusting the brake pressure applied to the service brake system triggers the service brake system to periodically activate one or more second service brakes of the second vehicle unit of the vehicle, applying the first periodic brake adjustment to the electric propulsion system of the vehicle and applying the second periodic brake adjustment to the service brake system of the vehicle.

2. The method according to claim 1, further comprising obtaining an indication of an available charging capacity of the electric propulsion system, and wherein determining the first and second periodic brake adjustments is further based on the available charging capacity of the electric propulsion system.

3. The method according to claim 2, wherein applying the first periodic brake adjustment comprises charging the electric propulsion system with at most the available charging capacity.

4. The method according to claim 2, wherein obtaining the indication of the available charging capacity comprises:
   obtaining a current State of Charge of the electric propulsion system, and
   determining the available charging capacity for the electric propulsion system based on the obtained current SoC.

5. The method according to claim 1, wherein the one or more second service brakes of the second vehicle unit are activated when the brake pressure applied to the service brake system is above a second brake pressure threshold.

6. The method according to claim 1, further comprising obtaining a target speed and/or a target retardation of the vehicle, and using the target speed and/or the target retardation of the vehicle for determining the first and second periodic brake adjustments.

7. The method according to claim 1, wherein determining the first and second periodic brake adjustments is further based on a timing parameter indicative of a frequency and/or period.

8. The method according to claim 1, wherein determining the first and second periodic brake adjustments is further based on an amplitude parameter indicative of a maximum adjustment to be applied by the first and/or second periodic brake adjustments.

9. The method according to claim 1, wherein the first and second periodic brake adjustments are out of phase.

10. A control unit configured to perform the method according to claim 1.

11. A first vehicle unit comprising a control unit according to claim 10,
   wherein the first vehicle unit is arranged to be connected to a second vehicle unit.

12. The first vehicle unit according to claim 11, wherein the first vehicle unit comprises an electric propulsion system.

13. A vehicle comprising a first vehicle unit according to claim 11, and wherein the vehicle further comprises:
   a second vehicle unit,
   a service brake system arranged to brake the vehicle based on a brake pressure, and wherein the service brake system is arranged to trigger an activation of one or more first service brakes of the first vehicle unit and one or more second service brakes of the second vehicle unit based on respective brake pressure thresholds, and
   an electric propulsion system arranged to brake the vehicle by converting energy of the vehicle to charge the electric propulsion system with a charging power.

14. A computer program comprising program code for performing the steps of claim 1 when said program code is run on a computer.

15. A computer readable medium carrying a computer program comprising program code for performing the steps of claim 1 when said program code is run on a computer.

* * * * *